United States Patent
Kiess et al.

(10) Patent No.: US 6,799,451 B2
(45) Date of Patent: Oct. 5, 2004

(54) SPARK GENERATING APPARATUS HAVING STRAIN GAGE CYLINDER PRESSURE MEASUREMENT FEATURE

(75) Inventors: Ronald J. Kiess, Decatur, IN (US); Robert A. Noel, Anderson, IN (US); James Tordt Wright, Anderson, IN (US); James Alva Boyer, Anderson, IN (US); Matthew W. Bell, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 142 days.

(21) Appl. No.: 09/799,362

(22) Filed: Mar. 5, 2001

(65) Prior Publication Data

US 2002/0121127 A1 Sep. 5, 2002

(51) Int. Cl.[7] .............................. G01L 23/22; F02P 13/00
(52) U.S. Cl. ...................... 73/35.07; 73/35.12; 123/634
(58) Field of Search .............................. 73/35.07, 35.12; 123/634, 637

(56) References Cited

U.S. PATENT DOCUMENTS

| | | | | |
|---|---|---|---|---|
| 4,920,494 A | * | 4/1990 | Abo et al. ................... | 701/104 |
| 5,672,812 A | | 9/1997 | Meyer ........................ | 73/35.07 |
| 5,831,263 A | | 11/1998 | Komachiya et al. ... | 250/227.17 |
| 6,062,087 A | | 5/2000 | Vovan ......................... | 73/726 |
| 6,119,667 A | | 9/2000 | Boyer et al. ................ | 123/634 |
| 6,131,465 A | * | 10/2000 | Wlodarczyk et al. ......... | 73/715 |
| 6,276,348 B1 | * | 8/2001 | Skinner et al. ............. | 123/634 |

FOREIGN PATENT DOCUMENTS

| | | | | |
|---|---|---|---|---|
| GB | 2304812 A | * | 3/1997 | ........... G01L/23/22 |
| JP | 59162431 A | * | 9/1984 | ............. G01L/9/04 |

* cited by examiner

*Primary Examiner*—Hezron Williams
*Assistant Examiner*—Jacques Saint-Surin
(74) *Attorney, Agent, or Firm*—Jimmy L. Funke

(57) ABSTRACT

An ignition coil, spark plug, and pressure sensor for an internal combustion engine are, in a preferred embodiment, integrated into a single assembly and mounted directly on a plug hole of an internal combustion engine. A hard spark plug shell serves as a pressure member and on which a strain gage is affixed. Changes in the pressure in the combustion chamber deform the shell, causing a corresponding change in the resistance of the strain gage. A bridge circuit or the like is used to measure the resistance change thereby providing a direct indication of cylinder pressure.

3 Claims, 2 Drawing Sheets

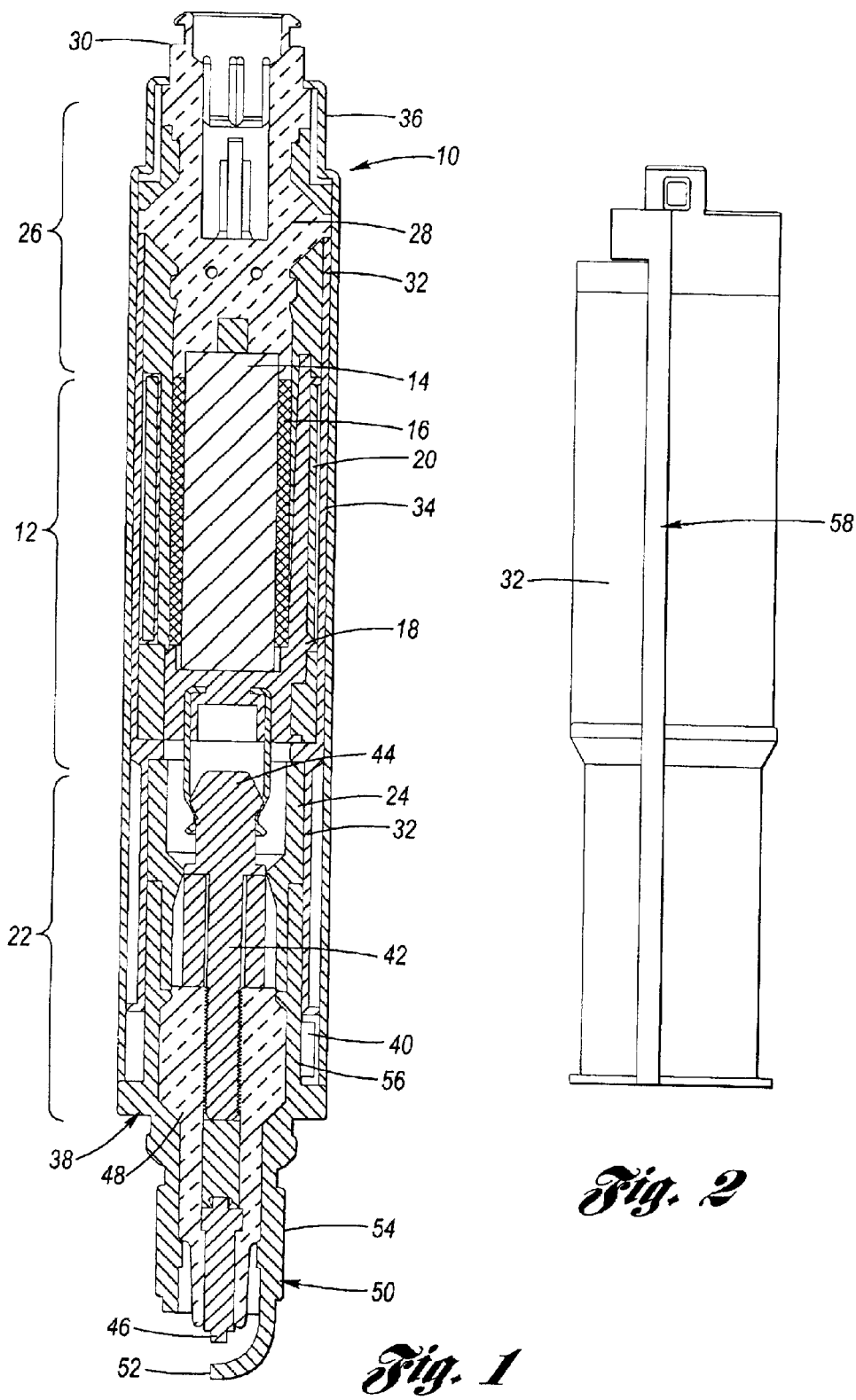

SPARK GENERATING APPARATUS HAVING STRAIN GAGE CYLINDER PRESSURE MEASUREMENT FEATURE

TECHNICAL FIELD

The present invention relates to a spark generating apparatus with a pressure sensor.

BACKGROUND OF THE INVENTION

An ignition coil for an internal combustion engine that is installed directly on an engine and that is directly coupled with spark plugs is known. However, such conventional ignition coils and/or spark plugs do not generally incorporate a pressure sensor and often are large and costly to produce. A pressure sensor mounted on a spark plug is known as disclosed in U.S. Pat. No. 5,672,812 to Meyer.

Meyer discloses a magnetostrictive pressure sensor device attached to a spark plug shell. The disclosed approach, however, requires a magnetized spark plug shell. This increases cost, and subjects the resulting signal to noise due to environmental factors (e.g., magnetic and electrical noise in an automotive environment).

U.S. Pat. No. 6,119,667 to Boyer et al. disclose an integrated spark plug/ignition coil with a pressure sensor for an internal combustion engine. The sensor is disclosed as a magnetostrictive sensor, and is further disclosed as using a radially polarized biasing magnet and a sensing winding. As with the Meyer device, additional components such as a magnet are needed, which increase cost and complexity.

Additionally, piezoelectric devices have been used in a laboratory environment but are not feasible for mass production. ION sense methods of detecting cylinder pressure are also known; however, such methods are indirect approaches for determining pressure.

There is therefore a need for an improved spark generating apparatus with pressure sensing for an internal combustion engine that minimizes or eliminates one or more problems as set forth above.

SUMMARY OF THE INVENTION

An object of the present invention is to solve one or more of the problems as set forth in the Background. An advantage of an apparatus according to the invention is that it provides a high quality signal indicative of a pressure detected in a combustion chamber of an internal combustion engine. The high quality signal is generated at a comparatively higher value than certain other pressure sensors conventionally used. Conventional pressure sensing arrangements provide reduced signal output under conditions of low cylinder pressure (i.e., idle or deceleration). The present invention provides a high signal to noise ratio under all operating conditions. Another advantage of the present invention involves flexibility of application. That is, a strain gage sensor portion of the present invention may be mounted in a variety of different locations and orientations.

An apparatus according to the present invention includes a central electrode, an insulator, a conductive shell, a second electrode, and a strain gage. The central electrode has a main axis and a first end configured for connection to a relatively high voltage source. The insulator is located outwardly of the central electrode. The central electrode further includes a second, exposed end opposite the first end. The conductive shell is located outwardly of and surrounds the insulator. The second electrode is spaced apart from the exposed end of the central electrode to define a spark gap therebetween. The second electrode is electrically connected to the shell. According to the invention, a strain gage is affixed to the shell. In operation, the shell becomes a pressure member wherein the stress applied to the shell during, for example, piston strokes, will flex the shell. The strain gage converts the deformation to a resistance change measurable by way of, for example, a bridge circuit, in one embodiment.

In an alternate embodiment, a spark generating assembly is provided that integrates an ignition coil with a spark plug configured to include a strain gage as described above. In still further embodiments, the strain gage is incorporated (i.e., applied to) into one or more fuel injectors of a Direct Gasoline Injection (DGI) engine, the glow plugs in a diesel engine, or any other component protruding into the combustion chamber. Additionally, the strain gage can be incorporated onto a cylinder head, head bolt, engine block, and/or main bearing cap or bolt. Moving parts could also be the subject of (destination for) the strain gage including the piston, connecting rod, crankshaft, and valve train components or the like.

A method of making a spark generating apparatus according to the invention is also presented.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a sectional view of the integrated spark plug and coil with pressure sensor according to the present invention;

FIG. 2 is a side view of the coil case of the integrated spark plug and coil with pressure sensor of FIG. 1 showing a flex circuit;

DETAILED DESCRIPTION OF THE PREFERRED EMBODIMENTS

Figure 4:
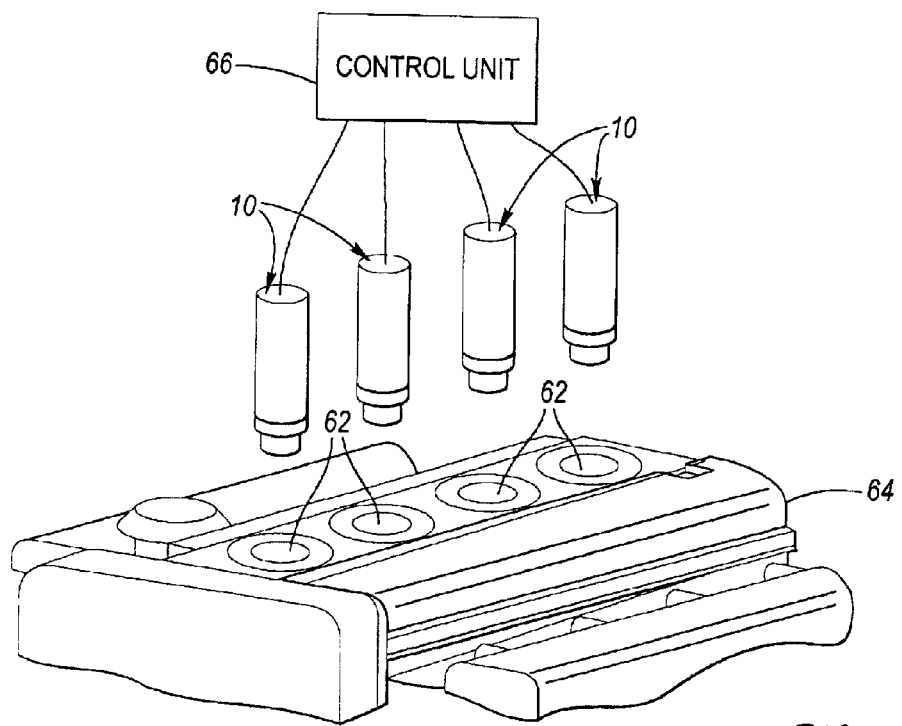
FIG. 4 is an exploded view of the integrated spark plug and coil with pressure sensor together with an engine and a control unit.

Referring now to the drawings wherein like reference numerals are used to identify identical components in the various views, FIG. 1 shows a preferred embodiment of an integrated ignition coil, spark plug and pressure sensor assembly 10 in accordance with the present invention. The assembly 10 is adapted for installation to a conventional internal combustion engine 64 through a spark plug shell and in threaded engagement with a spark plug opening 62 into a combustion cylinder. This arrangement is best shown in FIG. 4.

FIG. 1 illustrates assembly 10 having a transformer portion 12 comprising a core 14, a primary coil 16, a secondary spool 18 and a secondary coil 20, a connection portion 22 comprising a high-voltage boot 24, a control circuit portion 26 comprising an assembled connector portion 28 and a circuit interface portion 30, a coil case 32, an outer housing or shield 34 comprising a fastening head 36, a spark plug assembly 38, and a pressure sensor assembly comprising a strain gage 40. As further shown in FIG. 1, spark plug assembly 38 comprises a central electrode 42 having a first end 44 and a second end 46, an insulator portion 48, and a shell 50 comprising a second electrode portion 52, a threaded portion 54 and a center portion 56.

With continued reference to FIG. 1, assembly 10 has a substantially rigid outer housing 34 at one end of which is the spark plug assembly 38 and at the other end of which is the control circuit interface portion 30 for external electrical interface with a control unit 66, such as an engine control unit. The primary and secondary windings 16, 18 are arranged in a substantially coaxial fashion along with a high permeability magnetic core 14. All high voltage ignition system components are housed or are part of the integrated ignition coil, spark plug, and pressure sensor assembly 10. Generally, the structure is adapted for drop in assembly of components and sub-assemblies as later described.

Transformer portion 12 and control-circuit portion 26 (which are provided) for high-voltage generation, are inserted into outer housing 34. The control-circuit portion 26 responds to instruction signals from an external circuit (not shown) to cause a primary current to initially flow through primary coil 16 and then be interrupted when a spark is desired. The control circuit 26 may be external to the integrated coil/spark plug assembly 10. Connecting portion 22, which supplies a relatively high secondary voltage generated by the transformer portion 12 to the spark plug 38, is provided in a lower portion of the outer housing 34.

The outer housing 34 may be formed from round tube stock for example comprising nickel-plated 1008 steel or other adequate magnetic material. Where higher strength may be required, such as for example in unusually long cases, a higher carbon steel or a magnetic stainless steel may be substituted. A portion of the outer housing 34 at the end adjacent to the control circuit interface portion 30 may be formed by a conventional swage operation to provide a plurality of flat surfaces, thereby providing a fastening head 36, such as a hexagonal fastening head for engagement with standard sized drive tools. Additionally, the extreme end is rolled inward to provide necessary strength for torque applied to the fastening head 36 and perhaps to provide a shelf for trapping a ring clip between the outer housing 34 and the connector body 30. The previously assembled primary and secondary sub-assemblies are loaded into the outer housing 34 from the spark plug end to a positive stop provided by the swaged end acting on a top end portion of the connector body.

The transformer portion 12 is formed around the central magnetic core 14. The magnetic core 14 may be manufactured from plastic coated (insulated) iron particles in a compression molding operation. After the core 14 is molded, it is finish machined such as by grinding to provide a smooth surface absent, for example, sharp mold parting lines otherwise detrimental to the intended direct primary coil winding thereon.

Core 14 may also be formed using laminated thin silicon-steel plates of differing widths so that a cross section thereof becomes substantially circular. Optionally, magnets may be included as well in the core circuit. If included, the magnets may have polarity of reversed directions of magnetic flux generated by excitation by the primary coil 16 and are disposed on both ends of core 14.

The primary coil 16 may be, as shown, wound directly on the surface of the core 14. Coil 16 may be formed from insulated wire, which may be wound directly upon the outer cylindrical surface of the core 14. The winding of the primary coil 16 directly upon the core 14 provides for efficient heat transfer of the primary resistive losses and improved magnetic coupling which is known to vary substantially inversely proportionally with the volume between the primary coil 16 and the core 14. The core 14 is preferably assembled to the interior end portion of the connector body to establish positive electrical contact between the core 14 and a core-grounding terminal. However, the specific grounding of the core 14 is not essential to the operation of the present invention. Terminal leads of primary coil 16 may be connected to insert molded primary terminals by conventional processes such as soldering. Alternative constructions are possible, for example, via use of steel laminations for core 9 in combination with the primary coil wound on a primary coil spool (not shown). The foregoing is exemplary only and not limiting in nature.

The primary sub-assembly is inserted into the secondary coil spool 18. A secondary coil 20 may then be wound onto the outer periphery of the secondary spool 18. The secondary coil 20 may be either a segment wound coil or a layer (progressive) wound coil in a manner that is known to one of ordinary skill in the art.

The control-circuit portion 26 may contain circuitry for processing the strain gage signal and may be made up of a molded-resin switching element which controls a conduction current through the primary coil 16 to be intermittent, and a control circuit which is an igniter that generates the control signals of this switching element. Additionally, a heat sink, which may be a separate body, may be glued or otherwise adhered to the control-circuit portion 26 for heat radiation of circuit elements such as the switching element. However, as previously mentioned, the control-circuit portion 26 may be external to the spark plug assembly 38.

The interior of housing 34 retains the transformer portion 12, connector portion 28, and a high voltage boot 24. The coil case 32 is disposed within the outer housing 34 and is added for support and to support the coil. For the assembly process, the wound primary coil 16 with assembled connector 28 is assembled to the wound secondary spool 18 and then into the coil case 32.

The above-described ignition coil and spark plug assembly 10 is inserted in a plug hole of an internal combustion engine and is fixed to an engine. The spark plug assembly 38 that is mounted on a bottom portion of the plug hole is received within the connecting portion 22, and a high voltage terminal portion 44 of the spark plug 38 electrically contacts high voltage connector portion. The steel shield 34 may be welded to the spark plug to form a pre-assembled unit. The pre-assembled unit is then screwed into the spark plug hole in the engine head in the conventional manner. The unit may then be self-supporting with no attachment bolts required.

It is preferable that the ignition coil have a cross-sectional configuration and dimensions that are housable within the plug hole 62. According to this embodiment of the invention, a tube-portion cross section of the outer housing 34 is formed to be circular so that an inner-diameter dimension accommodates a plug hole 62, and an outer diameter thereof is established to be a suitable dimension as recognized by those skilled in the art.

As previously mentioned the coil case 32 is disposed within the outer housing 34. The coil case 32 extends from the spark plug shell 50 to the circuit interface portion 30. The coil case 32 also contains the core 14, primary coil 16, secondary spool 18, and secondary coil 20. Strain gage 40 is affixed to shell 50, particularly the center portion 56 thereof. Strain gage 40 maybe affixed in an axial (i.e., tension) arrangement, or, in an alternate embodiment, in a circumference (i.e., hoop stress) manner to center portion 56 of shell 50. Conventional adhesives known for the purpose of affixing strain gages may be used, with due regard for the expected elevated temperature of an engine In the embodiment illustrated in FIG. 1, strain gage 40 is electrically connected to a bridge circuit (see FIG. 5 for example), by way of a flex circuit 58, which is more clearly shown in FIG. 2. The use of flex circuit 58 eliminates what would otherwise involve individual termination/wiring to/from the strain gage 40. Using, for example, a resistive bridge, and attaching the strain gage 40 to the spark plug shell 50, the described arrangement will indicate the cylinder pressure of a running or motoring heat engine. The pressure applied to the center insulator of the spark plug during the piston strokes will cause a stress which will flex or deform the spark plug shell. 50. Such flexure will result in a change of resistance of the strain gage 40, and hence serve to vary the output of the bridge. A direct correlation of cylinder pressure to resistance change is measurable during the cycles of the heat engine.

The location of strain gage 40 on spark plug shell 50 is important for optimum performance. For example, axially oriented strain gage elements placed close to the rollover crimp will indicate a strong negative tensile output, as opposed to a strong positive tensile output if axially oriented and placed away from the crimp. The circumferentially oriented gage located away from the crimp produces a strong negative hoop indication. This is the Poisson effect. These facts may be utilized to advantage by those skilled in the art by placing strain gage elements onto the spark plug shell 60, and configuring the elements into a full bridge to produce an output significantly higher than a single strain gage element acting alone in a bridge made with three passive resistors.

The flex circuit 58 may comprise a multi-layer circuit. A ground plane layer thereof is disposed adjacent the coil case. Leads are then disposed on subsequent outer layers sandwiched between insulating layers. The ground plane, together with the insulating layers protect the connection leads from the high voltage of the coils and therefore reduces or eliminates noise coupling (ie., electromagnetic interference or EMI). The circuit interface portion 30 connects to the electrical system of the vehicle to both provide an electrical input and control of the coils, and communication of the engine control unit with the pressure sensing assembly.

Figure 3:
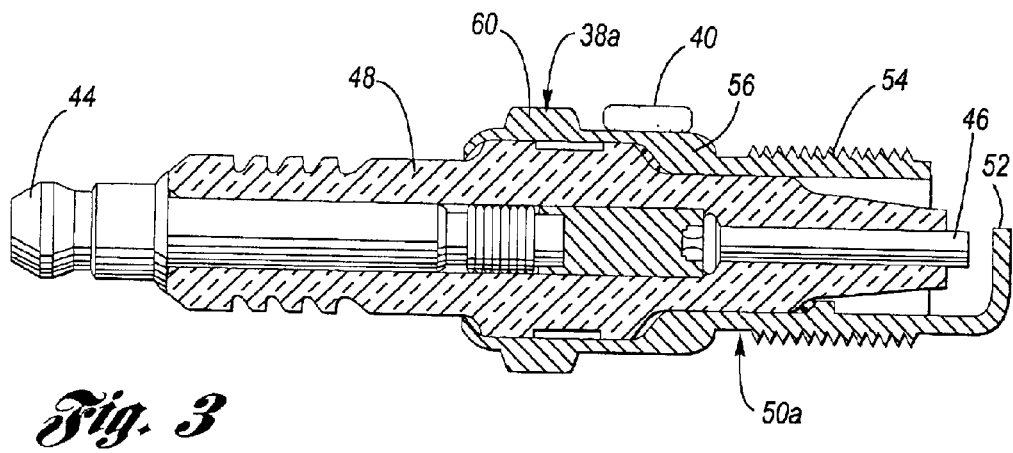
FIG. 3 is a sectional view of an alternate embodiment of the present invention illustrating a stand alone spark plug with a pressure sensor.

FIG. 3 shows an alternate embodiment of the present invention, namely spark plug assembly 38*a*. Spark plug assembly 38*a* is particularly adapted for standalone use (i.e., is not integrated with an ignition coil), although could be used with a conventional pencil coil. Spark plug assembly 38*a* is substantially identical to spark plug assembly 38 shown in FIG. 1, with the exception that shell 50*a* is modified to include a nut portion 60 adapted to receive a tool for installing the same in a threaded aperture 62 of an engine 64. Nut portion 60 may be either above or below location of strain gage 40.

FIG. 4 depicts several integrated spark plug coil and pressure assemblies 10 connected to a plug hole 62 of an engine 64. The assemblies are in turn connected to the engine control unit 66 that may include appropriate control logic to use the pressure information detected by gage 40. As described above, the present invention is configured to detect cycle-to-cycle pressure information and generate a respective pressure signal indicative of the detected pressure for each cylinder. Such plurality of pressure signals may be used by engine control unit 66 for calibrating engines to achieve improved performance with regard to fuel economy and exhaust emissions, while reducing indicated mean effective pressure (IMEP) variation. The output pressure signals are useful for closed-loop feedback control of combustion. Such control includes locating a peak cylinder pressure (e.g., with respect to top dead center—TDC), controlling cycle-by-cycle variation in IMEP and monitoring rate of pressure rise for each cylinder. In addition, one or more of the pressure signals may be used to detect misfire, knocking, or pre-ignition for a cylinder on an event-by-event basis. Additionally, positive control of spark timing, spark energy, air-fuel ratio, and charge dilution are possible using one or more of the pressure signals to thereby provide improvements in engine stability while reducing fuel consumption and exhaust emissions.

Figure 5:
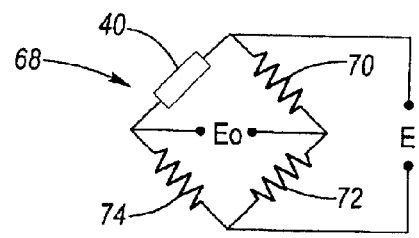
FIG. 5 is a schematic view of an exemplary bridge circuit for use with a pressure sensor of FIG. 1.

FIG. 5 shows an exemplary resistive bridge 68 including strain gage 40, and a plurality of resistors 70, 72, and 74. As arranged in FIG. 5, an input voltage designated E is applied to the bridge, as known to those of ordinary skill in the art. An output pressure signal $E_o$ is indicative of the detected pressure in the cylinder of engine 64 to which the embodiment of the invention is installed. Of course, it should be understood that the resistive bridge shown in FIG. 5 is simplified and is illustrated and described in exemplary terms only. More sophisticated arrangements, as well as calibration and scaling considerations, all such factors being well known to those of ordinary skill in the art, may be included and are considered within the spirit and scope of the present invention. Moreover, other conditioning circuits for detecting the resistance change presented by strain gage 40 may be used, and also remain within the spirit and scope of the present invention.

A strain gage is located on a shell portion of a spark plug assembly for monitoring in-cylinder pressure variation which occurs as a result of piston position, sweep volume, gas compression and expansion, rate of pressure rise, and combustion mixture burn characteristics. The present invention provides a high quality output signal indicative of detected pressure sensed in-cylinder pressure variation. The present invention provides a high signal-to-noise ratio under a wide variety of operating conditions, including idle or deceleration. Inasmuch as the strain gage has a low impedance, improved noise immunity is provided compared with other known pressure measurement devices.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A spark generating assembly for initiating combustion and detecting a pressure in a cylinder of an internal combustion engine, said assembly comprising:

an outer housing;

a control circuit interface portion coupled to a first end of said outer housing;

a central electrode having a main axis and a first end configured for connection to a relatively high voltage source;

an insulator radially outwardly of said central electrode, said central electrode further having a second, exposed end axially opposite said first end;

a conductive shell outwardly of said insulator and coupled to a second end of said outer housing, said shell having a center portion and an engagement portion, said engagement portion being configured to engage a corresponding aperture of said engine that is in communication with said combustion cylinder;

a second electrode spaced apart from said second end of said central electrode to define a spark gap therebetween, said second electrode being electrically connected to said shell;

a strain gage directly affixed to said center portion of said conductive shell whereby the strain gage strains with the shell due to direct affixation, said strain gage configured to detect deformations of said shell indicative of said pressure;

said assembly further comprising an ignition coil disposed within said outer housing configured to be connected to a low voltage source through said control circuit interface to selectively energize said ignition coil, said ignition coil being coupled to said first end of said central conductor and further configured to generate said relatively high voltage;

said assembly further comprising a bridge circuit electrically connected to said strain gage configured to generate a pressure signal indicative of said pressure;

wherein said outer housing, said control circuit interface portion, said ignition coil, said conductive shell and said strain gage are formed as an integrated assembly, and said strain gage and electrical connections to said bridge circuit are formed in a flex circuit.

2. The spark generating assembly of claim 1 further including electromagnetic interference (EMI) shielding associated with said flex circuit.

3. The spark generating assembly of claim 1 wherein said engagement portion of said shell comprises threads.

* * * * *